US007272204B2

(12) United States Patent
Jensen

(10) Patent No.: US 7,272,204 B2
(45) Date of Patent: Sep. 18, 2007

(54) METHOD AND APPARATUS FOR CLAMPING A RISER BRACE ASSEMBLY IN NUCLEAR REACTOR

(75) Inventor: Grant C. Jensen, Morgan Hill, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/929,490

(22) Filed: Aug. 31, 2004

(65) Prior Publication Data

US 2007/0189434 A1  Aug. 16, 2007

(51) Int. Cl.
*G21C 19/00* (2006.01)
(52) U.S. Cl. ............... 376/260; 376/285; 376/286; 376/277; 376/272; 376/392; 403/374.3; 254/104; 248/218.4; 248/230.5; 248/229.24
(58) Field of Classification Search ............ 376/372, 376/260, 285, 286, 277, 392, 407, 461; 254/104; 403/374.3; 285/24, 27, 412, 413, 420; 248/218.4, 248/227.3, 227.4, 230.5, 229.24
See application file for complete search history.

(56) References Cited

U.S. PATENT DOCUMENTS

| | | | | |
|---|---|---|---|---|
| 1,783,509 A | * | 12/1930 | Lahey | 138/99 |
| 2,436,952 A | * | 3/1948 | Conkey | 279/6 |
| 3,141,686 A | * | 7/1964 | Smith et al. | 277/608 |
| 3,469,852 A | * | 9/1969 | Smyk et al. | 277/623 |
| 3,536,204 A | * | 10/1970 | Auzins | 212/307 |
| 3,910,610 A | * | 10/1975 | Turner et al. | 285/337 |
| 3,921,687 A | * | 11/1975 | Stencel | 411/429 |
| 4,281,699 A | * | 8/1981 | Grube | 411/176 |
| 4,575,129 A | * | 3/1986 | Porowski | 285/15 |
| 4,675,149 A | * | 6/1987 | Perry et al. | 376/260 |
| 4,836,288 A | * | 6/1989 | Wester | 166/348 |
| 5,265,141 A | * | 11/1993 | Kobsa | 376/446 |
| 5,683,216 A | * | 11/1997 | Erbes | 411/120 |
| 5,839,192 A | * | 11/1998 | Weems et al. | 29/890.031 |
| 5,964,029 A | * | 10/1999 | Weems et al. | 29/723 |
| 5,978,433 A | * | 11/1999 | Erbes et al. | 376/372 |
| 6,053,652 A | * | 4/2000 | Deaver et al. | 403/24 |
| 6,108,391 A | * | 8/2000 | Deaver et al. | 376/262 |
| 6,233,301 B1 | * | 5/2001 | Robergeau | 376/302 |
| 6,320,923 B2 | * | 11/2001 | Wivagg et al. | 376/407 |

(Continued)

OTHER PUBLICATIONS

Encyclopedia Americana, "Shear", Groiler Online, Copyright 2005, http://ea-ada.grolier.com/cgi-bin/article?assetid=0354080-00, last accessed Mar. 9, 2005.*

(Continued)

*Primary Examiner*—James P. Trammell
*Assistant Examiner*—Daniel Lawson Greene, Jr.
(74) *Attorney, Agent, or Firm*—Harness, Dickey & Pierce

(57) ABSTRACT

An apparatus and method are provided which are designed to structurally replace welds that attach a riser brace assembly to a jet pump riser pipe. The riser brace assembly may include an upper clamp assembly, a lower clamp assembly, and a plurality of mechanical fasteners to provide clamping forces to the upper clamp assembly and the lower clamp assembly. The upper clamp assembly and the lower clamp assembly sandwich a riser brace support, wherein the riser brace support is provided with at least one through-hole to accommodate the plurality of mechanical fasteners.

10 Claims, 7 Drawing Sheets

U.S. PATENT DOCUMENTS

| | | | |
|---|---|---|---|
| 6,375,130 B1 * | 4/2002 | Jensen et al. | 248/74.1 |
| 6,438,192 B1 * | 8/2002 | Erbes et al. | 376/372 |
| 6,647,083 B1 * | 11/2003 | Jensen | 376/286 |
| 6,769,722 B1 * | 8/2004 | Krauleidis | 285/382 |
| 6,857,814 B2 * | 2/2005 | Jensen | 403/374.3 |
| 2004/0190671 A1 * | 9/2004 | Wivagg | 376/260 |

OTHER PUBLICATIONS

Pages 895 and 972, definitions of "pocket" and "receptacle", Meriiam Webster's Collegiate Dictionary Tenth Edition, (c) 2001.*

* cited by examiner

METHOD AND APPARATUS FOR CLAMPING A RISER BRACE ASSEMBLY IN NUCLEAR REACTOR

BACKGROUND OF THE INVENTION

1. Field of the Invention

This invention relates generally to nuclear reactors and, more particularly, to a method and apparatus for clamping a riser brace assembly to a jet pump assembly of a boiling water reactor.

2. Description of Related Art

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically-shaped shroud.

FIG. 1 is a schematic, partial cross sectional view, with parts cut away, of a reactor pressure vessel (RPV) 20 for a boiling water reactor. The RPV 20 has a generally cylindrical-shape and is closed at one end by a bottom head and at its other end by removable top head (not shown). A top guide (not shown) is situated above a core plate 22 within RPV 20. A shroud 24 surrounds core plate 22 and is supported by a shroud support structure 26. A downcomer annulus 28 is formed between shroud 24 and sidewall 30 of RPV 20.

An annulet nozzle 32 extends through sidewall 30 of RPV 20 and is coupled to a jet pump assembly 34. Jet pump assembly 34 may include a thermal sleeve 36 which extends through nozzle 32, a lower elbow (only partially visible in FIG. 1), and a riser pipe 38. Thermal sleeve 36 is secured at a first end (not shown) to a second end of the lower elbow. The first end of thermal sleeve 36 is welded to the second end of the lower elbow. A first end of the lower elbow similarly secured, or welded, to one end of riser pipe 38. Riser pipe 38 extends between and substantially parallel to shroud 24 and sidewall 30.

A riser brace assembly 40 stabilizes a riser pipe 38 within the RPV 20. The riser brace assembly 40 may be fabricated of type 304 stainless steel which, after periods of use, is susceptible to cracking at welded joints. The riser brace assembly 40 is fixedly connected between shroud 24 and sidewall 30, and primarily provides lateral support to the jet pump assembly 34 via riser pipe 38, as shown in FIG. 1. Additionally the riser brace assembly 40 is designed to accommodate for differential thermal expansion that results from reactor start-up and heat-up, and flow induced vibration that is incumbent in the reactor water recirculation system (not shown).

FIG. 2 illustrates a riser brace assembly 40 of FIG. 1. The riser brace assembly 40 primarily provides lateral support to the jet pump assembly 34 via riser pipe 38, and includes a riser brace block 43 and two riser brace leaves, an upper riser brace leaf 41 and a lower riser brace leaf 42. Leaves 41 and 42 are attached to the riser brace block 43 by welds, and the riser brace block 43 is welded to a support pad 130 which in turn is attached to a RPV sidewall 30. At the other end, the riser brace assembly 40 is connected to a yoke, such as brace plate 49, which is typically a ½-inch thick plate that is welded to the riser pipe 38.

In the riser brace assembly 40 of FIG. 2, there may be numerous weld sites including welds that attach the riser brace plate 49 to riser pipe 38, welds attaching the riser brace block 43 to the support pad 130, and welds attaching the leaves 41 and 42 to the brace plate 49. These welds are typically field welds (made on site). The welds connecting riser brace block 43 to upper and lower riser brace leaves 41 and 42 are shop welds (e.g., pre-fabricated in the shop).

FIGS. 3A and 3B illustrate another riser brace assembly 40. This riser brace assembly 40 also provides lateral support to the jet pump assembly via riser pipe 38, and includes a riser brace support 49 and two riser brace leaves, an upper riser brace leaf 41 and a lower riser brace leaf 42. However, in this assembly, the riser brace support 49 is welded to the riser pipe 38 at two weld sites. The two welds attaching the riser brace support 49 to the riser pipe 38 are designated as RS-8 and RS-9, as shown in cross section A-A in FIG. 3B. In addition, the welds attaching the riser brace leaves 41, 42 to the riser brace support 49 are indicated as RB-2a and RB-2c. It should be understood that only two weld points RB-2a, RB-2c are shown in this figure since welds RB-2b and RB-2d (not shown) are hidden in the figure.

However, lack of weld integrity will lead to failure of the riser brace assembly which provides support to the jet pump assembly. For instance, weld failure due to vibration fatigue, and/or weld cracking due to intergranular stress corrosion cracking (IGSCC) could cause one of the welds joining the riser brace assembly 40 to the RPV 20 to fail. As an illustrative point, FIG. 3A illustrates a cracked weld RS-9 between the riser brace assembly 40 and the riser pipe 38. Separation of the riser brace assembly 40 near this or any other weld area could adversely impact safety in BWRs. Potentially, should a riser brace assembly 40 break away from RPV 20 (e.g., at RPV sidewall 30) and/or the riser pipe 38, the riser pipe 38 may become unstable, and the jet pump assembly 34 could be adversely affected. If just one jet pump assembly is damaged, a substantial amount of piping must either be replaced or repaired. Since weld repairs in the area of the downcomer annulus 28 are typically not practical due to inaccessibility, and the potential for excessive radiation exposure to personnel is real, a need exists for a method and apparatus of securely clamping the riser braces to the jet pump assembly.

SUMMARY OF THE INVENTION

Accordingly, the present invention provides a method and apparatus for mechanically clamping the riser brace assembly to the jet pump riser pipe, more particular, structurally replacing welds that attach a riser brace assembly to a jet pump riser pipe.

In an exemplary embodiment, the riser brace clamp assembly may include an upper clamp assembly, a lower clamp assembly, and a plurality of mechanical fasteners to provide clamping forces to the upper clamp assembly and the lower clamp assembly.

Other exemplary embodiments of the apparatuses and methods of the invention separately provide the upper clamp assembly having an upper clamp and an upper frame.

Other exemplary embodiments of the apparatuses and methods of the invention separately provide the lower clamp assembly having a lower clamp and a lower frame.

Other exemplary embodiments of the apparatuses and methods of the invention separately provide the upper clamp assembly and the lower clamp assembly which sandwich a riser brace support, the riser brace support provided with at least one through-hole to accommodate the plurality of mechanical fasteners.

In yet other exemplary embodiments, the mechanical fasteners are clamping bolts and clamping bolt nuts.

In yet other exemplary embodiments, the clamping bolt nuts engage a bolt nut latch spring to permit the rotation of the bolt nuts in only one direction.

Other exemplary embodiments of the apparatuses and methods of the invention separately provide the upper clamp having adjustable wedges that adjust to interface the jet pump riser pipe, a jack bolt for adjusting the wedges to a desired position, and a jack bolt latch spring for permitting rotation of the jack bolt in only one direction.

Other exemplary embodiments of the apparatuses and methods of the invention separately provide the lower clamp having adjustable wedges that adjust to interface the jet pump riser pipe, a jack bolt for adjusting the wedge to a desired position and a jack bolt latch spring for permitting rotation of the jack bolt in only one direction.

Other exemplary embodiments of the apparatuses and methods of the invention separately provide the upper frame having shear pads for preventing deformation and bending when a clamping force is applied.

Other exemplary embodiments of the apparatuses and methods of the invention separately provide the lower frame having shear pads for preventing deformation and bending when a clamping force is applied.

Other exemplary embodiments of the apparatuses and methods of the invention separately provide the upper frame accommodating latch spring which engages with a latch teeth of a clamp bolt nut to prevent rotation of a bolt nut.

Other exemplary embodiments of the apparatuses and methods of the invention separately provide the lower frame having a square counter bore recess which engages with a clamp bolt to prevent rotation of the bolt.

These and other features and advantages of this invention are described in, or are apparent from, the following detailed description of various exemplary embodiments of the apparatuses and methods according to the invention.

BRIEF DESCRIPTION OF THE DRAWINGS

The present invention will become more fully understood from the detailed description given hereinbelow and the accompanying drawings, wherein like elements are represented by like reference numerals, which are given by way of illustration only and thus are not limitative of the present invention and wherein.

DETAILED DESCRIPTION OF EXEMPLARY EMBODIMENTS

A riser brace assembly in accordance with the invention is designed to structurally replace weld(s) attached between a riser brace support and a riser pipe. In general, the installation involves electric discharge machining (EDM) the riser brace support to install the riser brace clamp assembly, assembling the hardware in the reactor, adjusting wedges to secure proper interface of the clamp assembly to the riser pipe, and preloading and locking a plurality of mechanical fasteners to secure the riser brace assembly in place.

In order for the riser brace clamp assembly to interface with the riser pipe, adjustable wedges are radially moved so that the upper and lower clamps clamp tightly on the riser pipe. These wedges may be advanced by rotation of mechanical fasteners, for example, but not limited to jack bolts. Additionally, latches are provided to lock the mechanical fasteners, and thus secure the fasteners and wedges in the desired position.

Figure 1:
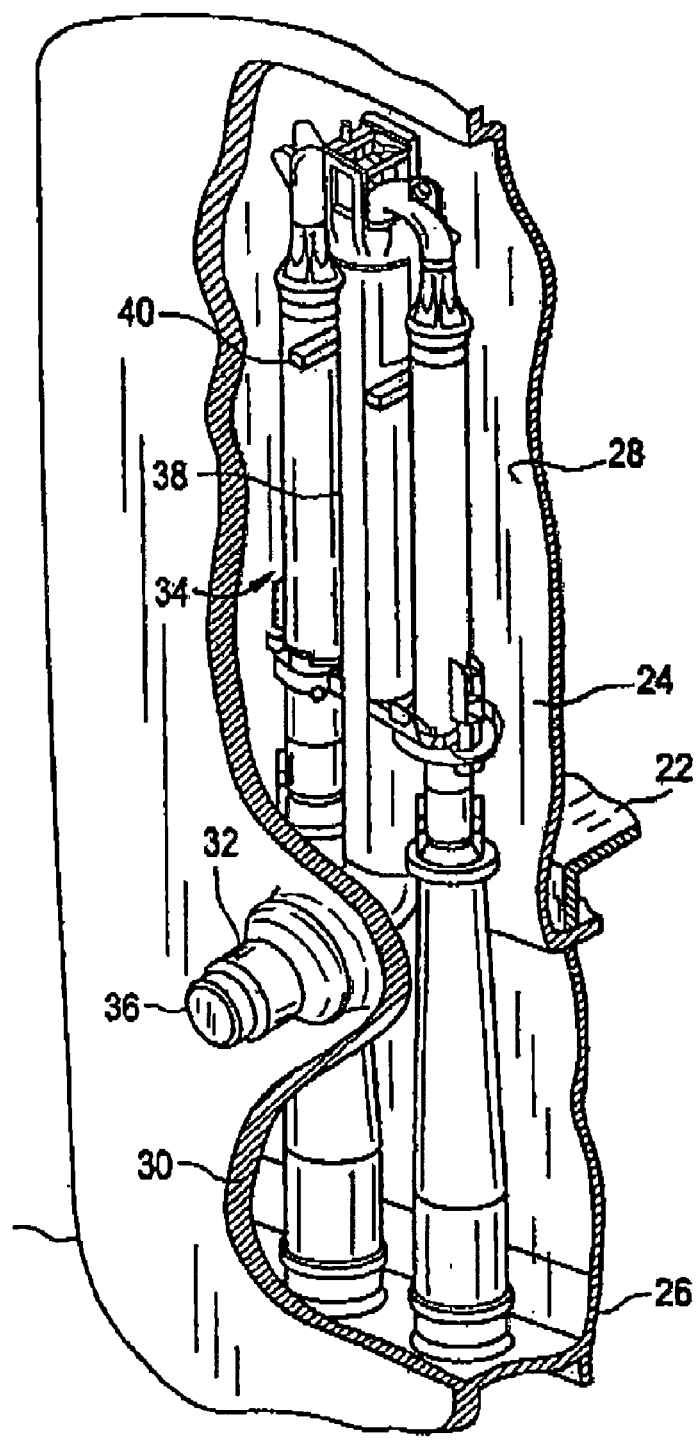
FIG. 1 is a schematic, partial cross-sectional view, with parts cut away, of a reactor pressure vessel (RPV) of a boiling water nuclear reactor.
Figure 2:
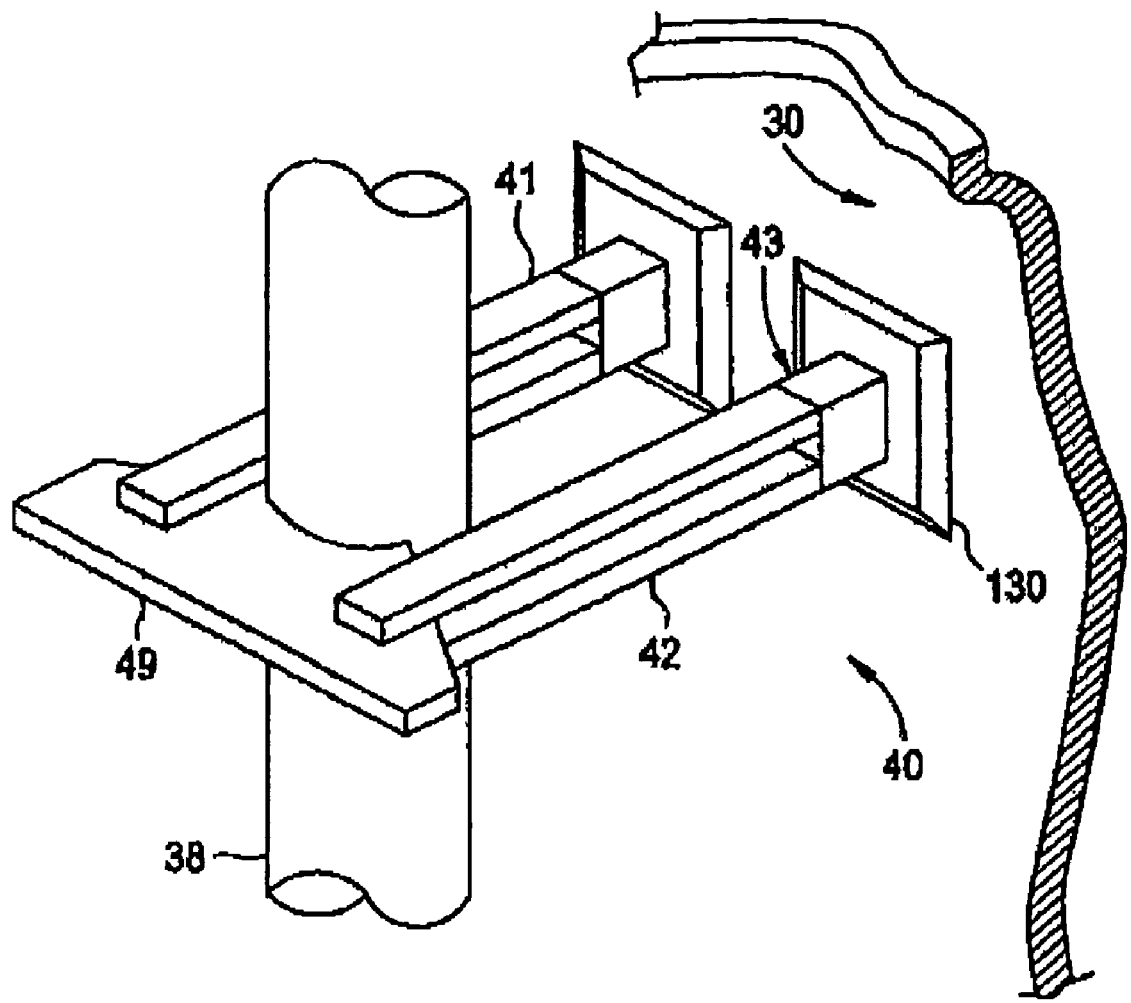
FIG. 2 illustrates a riser brace assembly in accordance with an exemplary embodiment of the invention.
Figure 3A:
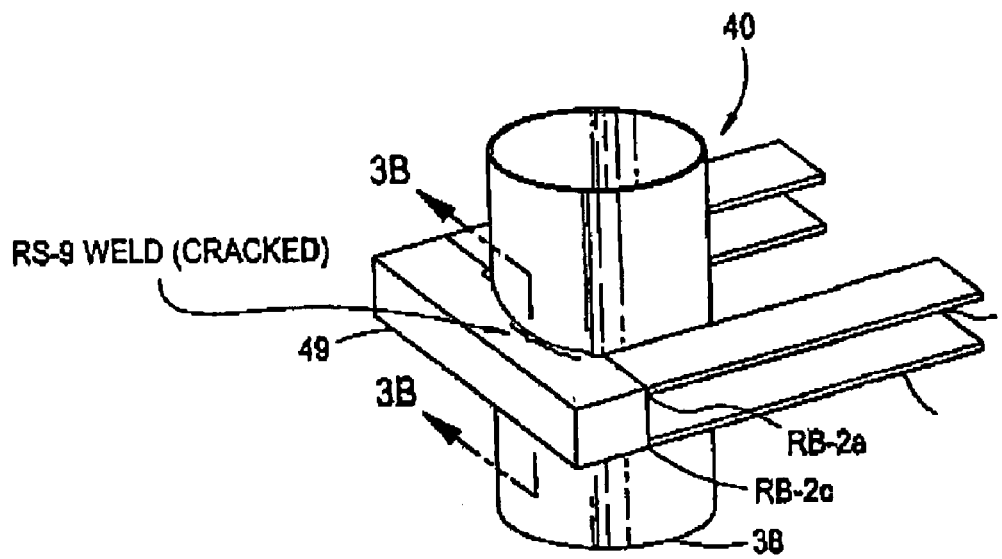
FIGS. 3A and 3B illustrate another riser brace assembly in accordance with an exemplary embodiment of the invention.
Figure 3B:
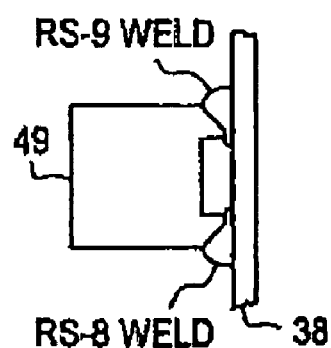
Figure 4:
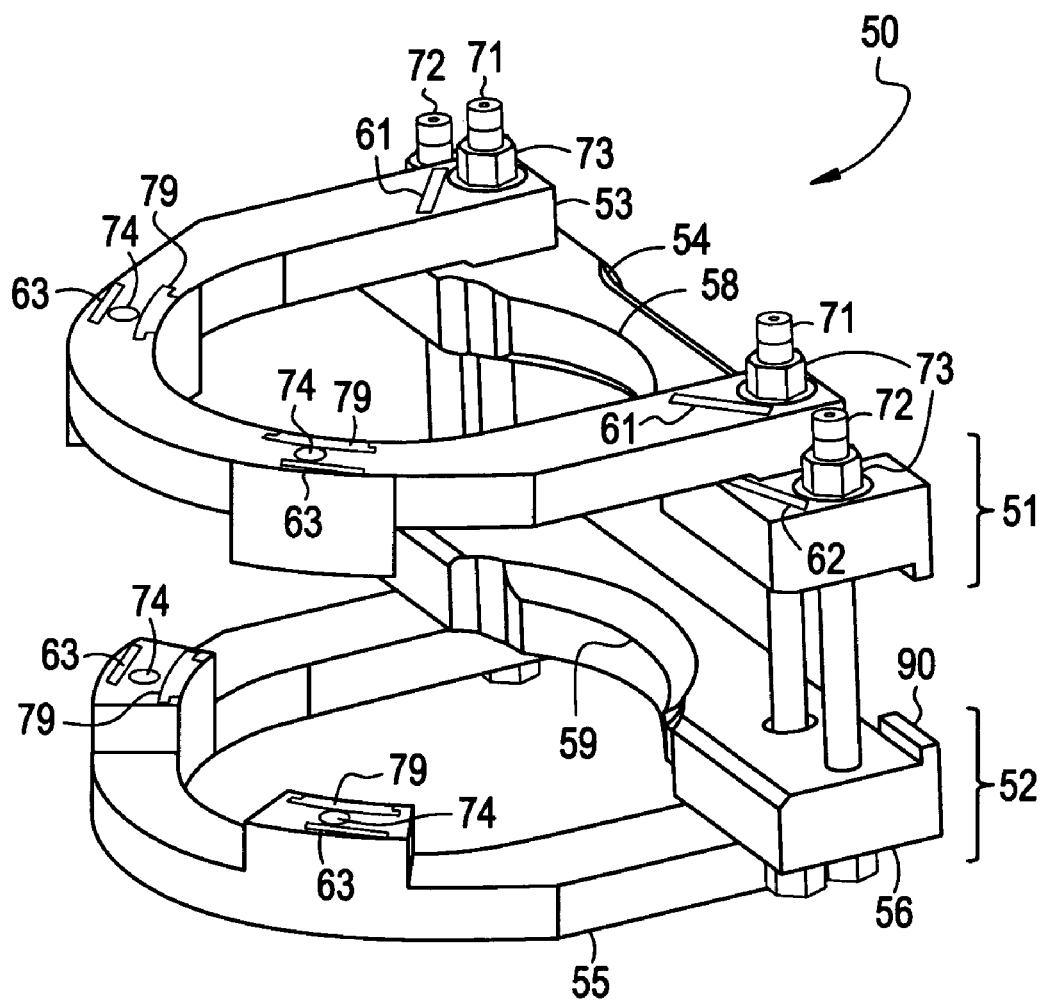
FIG. 4 is an isometric view of a riser brace clamp assembly in accordance with an exemplary embodiment of the invention.

FIG. 4 is an isometric view of a riser brace clamp assembly 50 in accordance with an exemplary embodiment of the invention. The riser brace clamp assembly 50 provides lateral support to the riser pipe 38 and the jet pump assembly. The riser brace clamp assembly 50 includes an upper clamp assembly 51, a lower clamp assembly 52, and a plurality of mechanical fasteners 71, 72, 73. The upper clamp assembly 51 and the lower clamp assembly 52 sandwich a riser brace support 49 (shown in FIG. 6). Upper clamp assembly 51 and lower clamp assembly 52 are securely fixed to a riser brace support 49 by a plurality of mechanical fasteners, for example, clamp bolts 71, frame bolts 72, and bolt nuts 73. It should be appreciated that other fasteners may be utilized besides the nut and bolt arrangement.

The upper clamp assembly 51 includes an upper clamp 53 and an upper frame 54 that engage with each other. The upper frame 54 includes two large pockets 77 (shown in FIG. 5) on the top surface of the upper frame 54 so that an end of the upper clamp 53 may be fittingly received for securement. The pockets 77 may include a slotted hole via the upper frame 54 to accommodate the clamp bolts 71. Further, the upper frame 54 includes a curved surface 58 on the inner side of the frame so as to receive the outer surface of the riser pipe 38 (not shown). The curved surface 58 may be machined beforehand to have a radius to respectively fit the radius of the riser pipe 38. The upper frame 54 may include additional slots, holes, and under-cuts to contain other parts. As an exemplary embodiment, the upper frame 54 includes slots 62 to accommodate a frame latch spring 65 and a bore hole 80 to receive bolt nut 73. The slots 62 may be positioned near the ends of the upper frame 54 and adjacent to the bore hole 80. The slots 62 should be adjacent to the bore hole 80 so that latch spring 65 engage the bolt nut 73 in the upper frame 54. The engagement of the latch spring 65 to the bolt nut 73 will be discussed in detailed later.

The upper clamp 53 includes slots and holes to accommodate and receive various parts. As an exemplary embodiment, slots 61, 63 may be provided to accommodate latch springs 85, 95, respectively, a bore hole 81 may be provided to receive a bolt nut 73, a hole 74 may be provided to receive a bolt 76 (i.e., a jack bolt), and a wedge slot 79 may be provided to receive wedge 98. In the exemplary embodiment, the upper clamp 53 may include two slots 61, two slots 63, two bore holes 81, two bolt holes 74 and two wedge slots 79. However, it should be appreciated that the upper clamp 53 may include more than two slots 63, 79 and holes 74 to accommodate the adjustable wedges 98.

Slot 61 should be adjacent to the bore hole 81 so that latch spring 85 engage the clamp bolt nut 73. The bore hole 81 accommodates the clamp bolt 71. Slot 63 should be adjacent to the bolt hole 74 so that latch spring 95 may engage the jack bolt 76. Because vibration is a major concern in a reactor water recirculation system due to reactor recirculation pumps, various parts may become loose. For example, jack bolts 76 may become loosen if enough vibration is generated. Thus, latch springs 95 are provided to engage a teeth 78 in the head of the jack bolt 76 with a teeth 97 of the latch spring 95 to prevent rotation of the jack bolt 76. Hole 74 accommodates the jack bolt 76, which in turn moves the wedge 98 to interface with the riser pipe 38. The jack bolt 76 includes equally spaced ratchet teeth 78 which are machined into the periphery of the jack bolt head. These ratchet teeth 78 engage the teeth 97 (shown in FIG. 5) of the latch spring 95. This locks the jack bolt 76 in position and prevents the jack bolt 76 from becoming loose in a flow-induced vibration environment which is indigenous to a riser brace assembly 50. The jack bolt 76 may rotate so as to adjust the position of the wedge 98. The rotation of the jack bolt 76 may be performed with a hexagonal wrench which accommodates the jack bolt 76 via an internal hexagon interior shape in the head of the jack bolt 76. As the jack bolt 76 is rotated, the wedge 98 moves in the wedge slots 79, and thus reduces the radial distance (gap) between the wedge 98 and the riser pipe 38.

The lower frame 56 is essentially identical to the upper frame 54, except a bottom surface of lower frame 56 includes a counter-bore recess (not shown). It should be appreciated that the counter-bore recess can be in a shape of a square so as to receive the square head of the frame bolt 72. The counter-bore recess ensures that the frame bolts 72 do not rotate under the action of applying torque to the bolt nuts 73. As an exemplary embodiment, the head of the frame bolt 72 may be a hexagonal shaped head. Further, the lower frame 56 will not include slots 62 found in the upper frame 54 since the bolt nuts 73 only engage with the upper frame 54.

In the exemplary embodiment, the upper clamp 53 and lower clamp 55 may be formed in a U-like shape. However, it should be understood that the upper and lower clamps 53, 55 can be in other shapes, which is dependent on the design of the riser pipe 38.

The lower clamp 55 is essentially identical to the upper clamp 53, except a bottom surface of lower clamp 55 includes a counter-bore recess (not shown). It should be appreciated that the counter-bore recess can have a square feature to interface with a square male feature in the head of the clamp bolt 71. The counter-bore recess ensures that the clamp bolts 71 do not rotate under the action of applying torque to the bolt nuts 73. It should be understood that the shape of the counter-bore recess should match the shape of a projection 91a (shown in FIG. 5) in the head of the clamp bolt 71. The head of the clamp bolt 71 may be a hexagonal shaped head.

Figure 5:
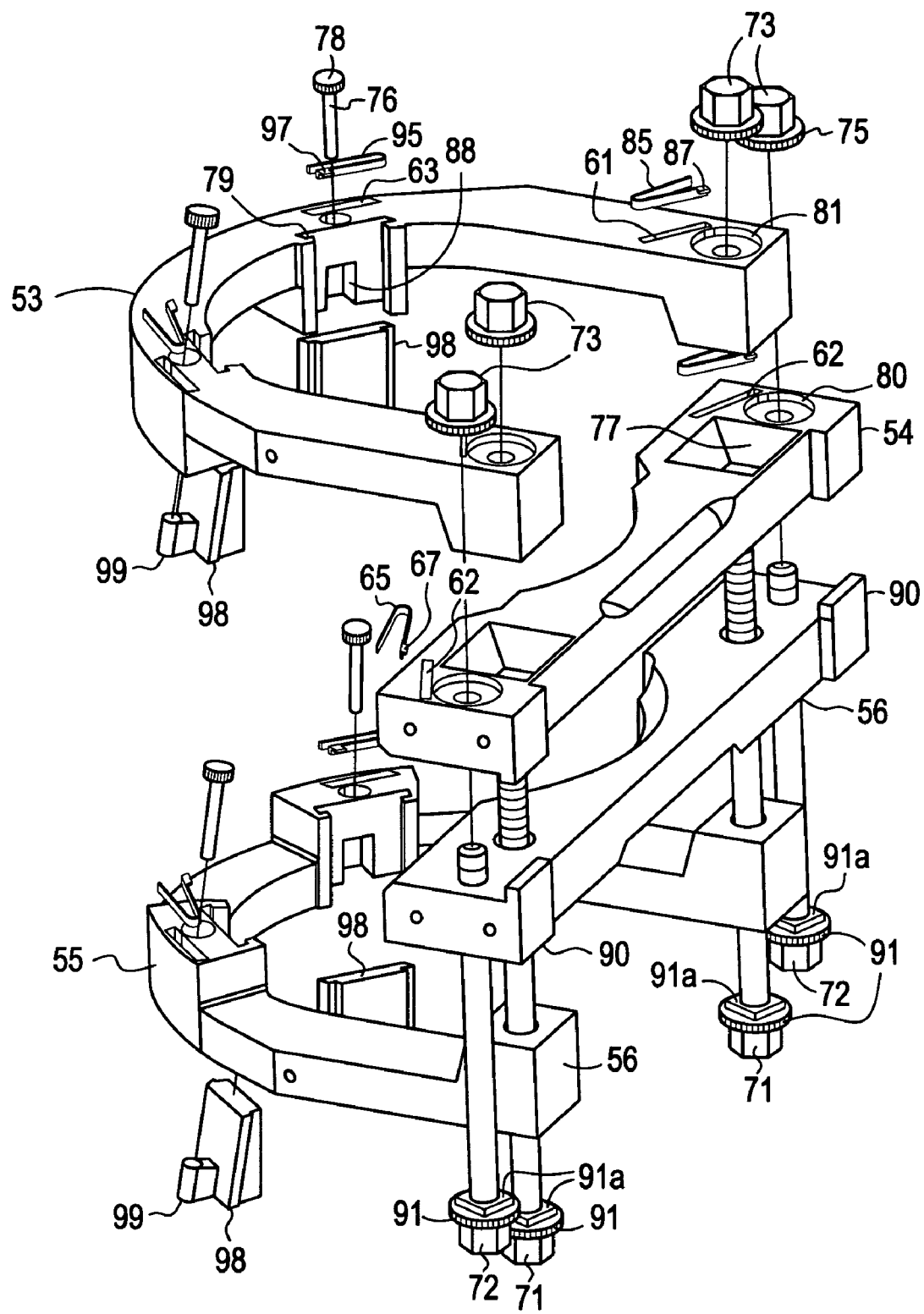
FIG. 5 is a exploded prospective view of the riser brace clamp assembly shown in FIG. 4, in accordance with an exemplary embodiment of the present invention.

FIG. 5 is a exploded prospective view of the riser brace assembly shown in FIG. 4, in accordance with an exemplary embodiment of the invention. As mentioned, the riser brace clamp assembly 50 includes an upper clamp assembly 51, lower clamp assembly 52, and a plurality of mechanical fasteners (e.g., clamp bolts 71, frame bolts 72, and bolt nuts 73).

The clamp and frame bolts 71, 72 may preferably contain external 13/16-16UN threads at the distal end and a flange 91 at a proximal end (bolt head end). The flange 91 provided at the proximal end seats in a counter-bore recess (not shown) of the lower clamp 55 and lower frame 56 upon assembly. The flange 91 may include a square-like shaped protrusion 91a extending slightly outward from the shank of the bolts 71, 72 so that the protrusion 91a tightly seat with a square counter-bore recess. This ensures that the bolts 71, 72 will not rotate when torque is applied to the bolt nuts 73, and prevents rotation under all conditions (i.e., flow induced or vibration).

The bolt nuts 73 may accommodate both the clamp bolt 71 and frame bolt 72 since the bolts 71, 72 are nearly identical. The bolt nuts 73 may preferably be threaded with an internal 13/16-16UN tap (not shown), although other tap dimensions are within the purview of this invention. Further, the bolt nut 73 may include equally spaced ratchet teeth 75 that are machined into the outer circumference of the head of bolt nuts 73. The ratchet teeth 75 engages with spring latches 65 and 85 in the upper frame 54 and upper clamp 53, respectively.

Frame bolt nut spring latch 65 and clamp bolt nut spring latch 85 each include ratchet teeth 67 and 87, respectively, that interface with bolt nut ratchet teeth 75. As the bolt nuts 73 are rotated in the direction to increase bolt preload, the springs and latches behave like cantilever beams in deflecting the necessary distance to allow rotation of the respective nuts 73. The ratchet teeth 75 in the bolt nut 73 and ratchet teeth 67, 87 in the latch springs 65, 85 are oriented such that rotation in the desired direction is permitted. The bolt nuts 73 can be removed only after the latch springs 65, 85 and ratchet teeth 75 in the bolt nut 73 and teeth 67, 87 in the springs 65, 85 have been "cammed back" to provide clearance for the subject teeth.

Spring latch 95 resides in a machined slot 63 and similarly functions the same as latch 65, 85 except the latch 95 interface with a bolt 76. For example, but not limited to, the bolt 76 may be a jack bolt. The jack bolt 76 includes equally spaced ratchet teeth 78 which are machined into the periphery of the jack bolt head. The ratchet teeth 78 engage teeth 97 of the spring latch 95 to lock the jack bolt 76 in position and prevent the jack bolt 76 from becoming loose when vibration is produced in the jet pump assembly. The rotation of the jack bolt 76 adjusts the position of the wedge 98.

The wedge 98 is provided in a wedge slot 79. The purpose of the wedge slot 79 is to maintain the moveable wedge 98 in place until the jack bolt 76 rotates to cause a change in position. The wedge 98 includes a projection 99 that slides into an opening 88 in the wedge slot 79. The opening 88 accommodates the jack bolt 76 to extend through so that the jack bolt 76 may thread into the projection 99 in the wedge 98. As the jack bolt 76 rotates by tightening the bolt 76, the wedge 98 moves in the radial direction towards the center of the riser pipe 38. This produces an interface on the pipe 38 as the wedge 98 moves radially towards the center, and thus provides the riser brace assembly 50 to have a tight secure interface with the riser jet pipe 38. The tight interface produced by the wedge 98 is caused by the shape of the wedge 98 (e.g., "wedge-like" shape). In other words, the wedge 98 having a longer base near the bottom and becoming narrower towards the top. Accordingly, as the jack bolt 76 is tightened, the wedge 98 is drawn up by virtue of the threaded engagement. As the wedge 98 is drawn up, it moves radially towards the surface of the riser pipe 38. Although the wedge 98 acted upon by the jack bolt 76 may result in a radial force imparted to the riser pipe 38, it should be appreciated that the clamping forces are generated by the wedge features of the upper and lower clamps 53, 55 interfacing with the wedge pockets 77 acted upon by the clamp bolts 71. The jack bolts 76 are not large enough to provide the needed preload (e.g., the required clamping force).

It should be appreciated that wedge 98 may encompass other shapes besides the one shown in the exemplary embodiment.

It should further be appreciated that the slot 63 will be dependent on the outer shape of the wedge 98. This ensures a proper fit and securement.

Shear pads 90 may be included in the upper and lower frames 54, 56. The upper and lower frames 54, 56 are machined with shear pads 90 at the back surface of the frames so as to come into contact with the vertical surface of the riser brace support 49 (shown in FIG. 6). These shear pads 90 prevent deformation or bending of the frame components when subjected to clamping forces induced by the assembly.

Figure 6:
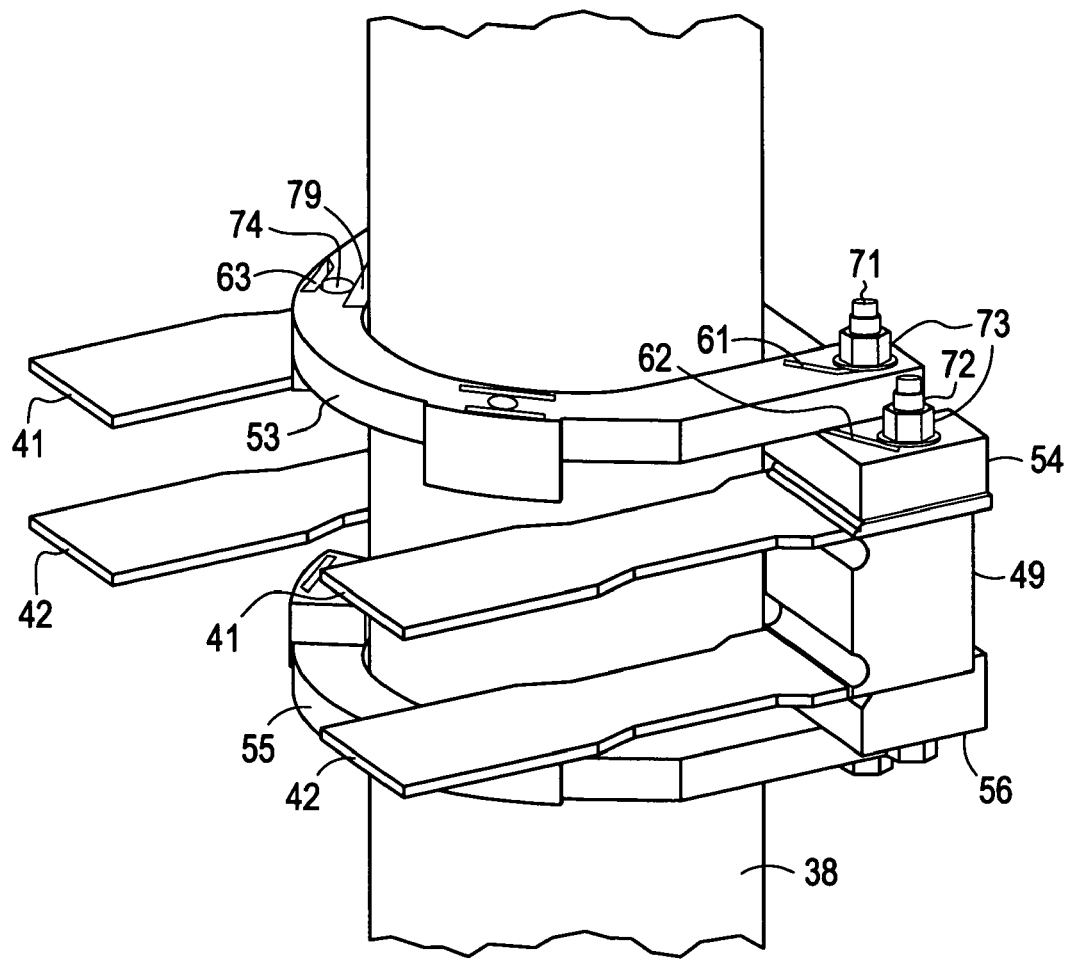
FIG. 6 illustrates the connection of the riser brace clamp assembly to a riser jet pump in accordance with an exemplary embodiment of the present invention.

FIG. 6 illustrates the connection of the riser brace clamp assembly 50 within a riser pipe 38 in accordance with an exemplary embodiment of the invention. Specifically, FIG. 6 illustrates a isometric view of riser brace clamp assembly 50 in order to more clearly depict how the various components of the riser brace clamp assembly 50 interface with the riser pipe 38.

The riser brace clamp assembly 50 provides lateral support to the riser pipe 38 and the jet pump assembly. The riser brace clamp assembly 50 includes an upper clamp assembly 51, a lower clamp assembly 52, a riser brace support 49, and two riser brace leaves (e.g., an upper riser brace leaf 41 and a lower riser brace leaf 42). At one end, the leaves 41 and 42 can be welded to a support pad which in turn is affixed to RPV sidewall (not shown). At the other end, leaves 41 and 42 of the riser brace clamp assembly 50 are connected, preferably by welds to a riser brace support 49.

It should be appreciated that chamfers may be incorporated into the design of the frame components 54, 56 to provide clearance and afford visual inspection of the welds that join the riser brace leaves 41, 42 to the riser brace support 49.

Figure 7:
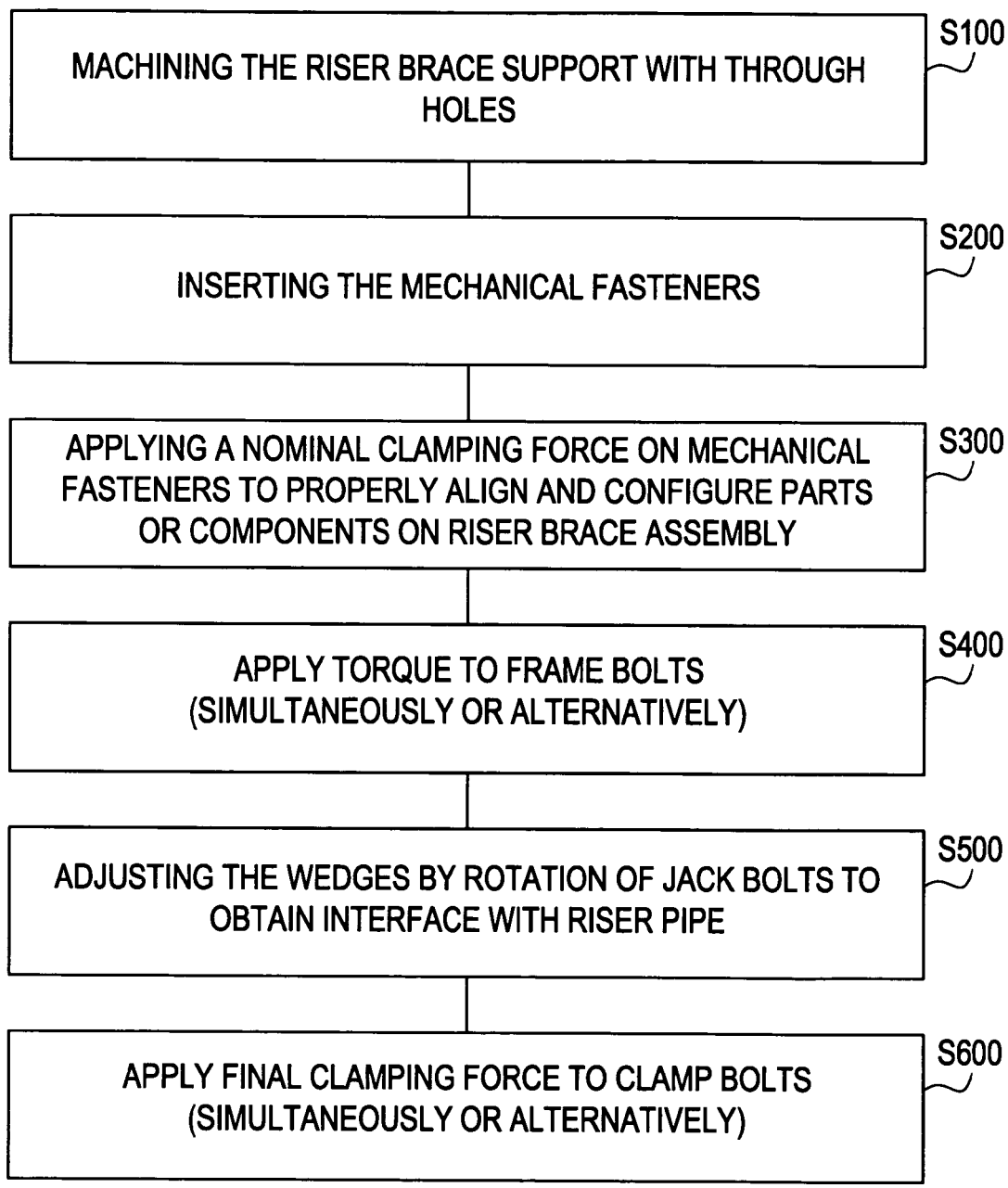
FIG. 7 is a flowchart illustrating an exemplary method of clamping a riser brace assembly in accordance with the invention.

FIG. 7 is a flowchart illustrating an exemplary method of clamping a riser brace assembly to the jet pump riser pipe in accordance with the invention. In general, after reactor safety procedures for maintenance/repair personnel have been complied with, and an overall inspection of the installation locations has been videotaped, looking for anything unexpected relating to the as-built configuration of the riser brace assemblies, which is transported by special tooling connected to clamp apparatus at several locations to a submerged location in the reactor, is installed. Prior to the installation, if there are any obstructions on the riser brace support, specifically on the upper and lower horizontal surfaces where the frame 54 and 56 interface with the support, the obstruction may be removed by electric discharge machining (EDM) and/or grinding with an abrasive material, as is known.

Specifically, holes are machined in the riser brace support 49 (Step S100). This may be accomplished by in-vessel machining (e.g., electric discharge machining (EDM). The through-holes produced in the riser brace support 49 accommodate mechanical fasteners 71, 72. It is preferable that the riser brace support 49 may have four holes to accommodate each of the mechanical fasteners 71, 72.

As maneuvering within RPV is difficult, since the riser brace clamp assembly 50 is to be installed remotely that is often in excess of 60 feet away from the free surface of the water which floods the reactor cavity. A reactor cavity is flooded with water to protect personnel from radiation hazard. Accordingly, it may be necessary to pre-assembly the components as much as possible. In general, the jack bolts 76, adjustable wedges 98 and jack bolt latches 95 in the upper clamp 53 and lower clamp 55 may be pre-assembled prior to installation. Other pre-assembly may include the latch springs 65 in the upper frame 54 and latch springs 85 in the upper clamp 53.

Next, the components of riser brace clamp assembly 50 are assembled in the reactor on the riser brace assembly (step S200). Particularly, the upper frame 54 and the lower frame 56 are positioned in the RPV with the frame bolts 72 extending through holes 80. Once the bolts 72 are received by the holes 80 in the upper frame 54, nut bolts 73 are installed to engage the frame bolts 72 for securement. Thereafter, the components of the upper clamp 53 and the lower clamp 55 are installed. The upper clamp 53 engagingly slides into the wedge pockets 77 found in the upper surface of the upper frame 54. The lower clamp 55 engagingly slides into the wedge pockets 77 found in the bottom surface of the lower frame 56. As the frame components 54, 56 and the clamp components 53, 55 are engaged, clamp bolts 71 extend through holes 81. Once the clamp bolts 71 are received by the holes 81 in the upper clamp 53, nut bolts 73 are installed to secure the clamp bolts 71 to the assembly 50.

Nominal clamping forces are applied (step S300) to fixedly secure the riser brace clamp assembly 50 to the riser pipe 38. The clamping forces may also properly align and configure the components of the clamp assembly 50 on the riser brace assembly 40. The bolt nuts 73 on the frame bolts 72 are installed and initially tightened to a desired torque (e.g., to 2+/−1 lb-ft, for example). Then the bolt nuts 73 are gradually torqued (in 5 lbs-ft increments up to 30 lbs-ft, for example) in simultaneously or in alternating fashion to maintain even pressure on the clamp assembly 50 (step S400). This ensures that the force is evenly distributed to both the upper and lower frames 54, 56, respectively. It should be appreciated that the teeth 67 in the latch springs 65 are fully engaged with the teeth 75 of the nut bolts 73 at this juncture. This ensures that the nut bolts 73 will rotate is in only one direction.

After the upper clamp 53 and lower clamp 55 are configurable aligned and properly on the riser brace assembly 40 and with clamp bolt nuts 73 fully engaged with the latch springs 85, the wedges 98 provided in slots 79 are adjusted to apply the proper interface on the riser pipe 38 (step S500). Adjustments may be needed to obtain uniform contact of the clamps to the riser pipe 38. The jack bolt 76 can be designed with an internal hexagonal head and rotated with a hexagonal-fitted wrench. As the jack bolt 76 rotates, the wedges 98 move in the wedge pockets 79 which move with a radial component of direction towards the center of the riser pipe 38. Because the jack bolt 76 is threaded into the adjustable wedges 98, the action of rotating the jack bolt 76 pulls or draws the wedges 98 up the wedge slots 79. Since the wedge slots 76 are oriented at an angle in the vertical position, as the wedges 98 are drawn up, the wedges 98 move radially closer to the center of the riser pipe 38. It should be appreciated that the wedges 98 are independent from each other so as to provide adjustments to interface the surface of the riser pipe 38 that may not be perfectly round. This radial component of direction provides the wedges 98 to have a tight secure interface to the riser jet pipe 38.

Once the wedges 98 have been adjusted to a tight fit, a final clamping torque is applied on the clamp bolts 71 to provide a final pre-load on the bolts (step S600). The clamp bolts 71 may be gradually pre-loaded simultaneously or in alternating fashion to maintain even pressure on the clamp assembly 50. This ensures that the force is evenly distributed to both the upper and lower clamp assemblies 51, 52.

The installed riser brace clamp assembly 50 structurally replaces welds that attach a riser brace assembly to a jet pump riser pipe. Additionally, the installed riser brace clamp assembly 50 may stiffen the entire jet pump assembly, thereby decreasing the natural vibration frequency. This is significant due to the flow-induced vibration that is inherent in a jet pump assembly of a BWR. The riser brace clamp assembly 50 may also be designed to accommodate the differential thermal expansion that results from reactor start-up and heat-up, and to accommodate the flow-induced vibration that is incumbent in the reactor water recirculation system (not shown) due to reactor recirculation pumps.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed:

1. A riser brace clamp assembly for clamping a riser brace assembly to a jet pump riser pipe in a nuclear reactor, comprising:
   an upper clamp assembly having an upper clamp and an upper frame, the upper clamp being substantially U-shaped so as to be configured to be secured around the jet pump riser pipe, and having two end portions, each of the two end portions including an opening therein;
   a lower clamp assembly having a lower clamp and a lower frame, the lower clamp being substantially U-shaped so as to be configured to be secured around the jet pump riser pipe, and having two end portions, each of the two end portions including an opening therein;
   a plurality of mechanical fasteners for clamping the upper clamp assembly and the lower clamp assembly together,
   wherein the upper frame includes a respective recess for receiving one of the two end portions of the upper clamp respectively, and the lower frame includes a respective recess for receiving one of the two end portions of the lower clamp respectively, respective recesses and openings being vertically aligned so that at least one of the plurality of mechanical fasteners extends through respective recesses and openings.

2. The riser brace clamp assembly according to claim 1, wherein the plurality of mechanical fasteners are clamping bolts and clamping bolt nuts.

3. The riser brace clamp assembly according to claim 2, wherein the clamping bolt nuts engage a bolt nut latch spring so as to permit the rotation of the bolt nuts in only one direction.

4. The riser brace clamp assembly according to claim 1, wherein the upper clamp further comprises:
   an adjustable wedge;
   a jack bolt for adjusting the wedge; and
   a jack bolt latch spring for preventing the jack bolt to move in one direction.

5. The riser brace clamp assembly according to claim 1, wherein the lower clamp further comprises:
   an adjustable wedge;
   a jack bolt for adjusting the wedge; and
   a jack bolt latch spring for preventing the jack bolt to move in one direction.

6. The riser brace clamp assembly of claim 1, wherein the upper frame further comprises shear pads for preventing deformation and bending of the upper and lower clamps when a clamping force is applied.

7. The riser brace clamp assembly of claim 1, wherein the lower frame further comprises shear pads for preventing deformation and bending of the upper and lower clamps when a clamping force is applied.

8. The riser brace clamp assembly of claim 6, wherein the upper frame further comprises a latch spring for permitting rotation of a clamp bolt nut in only one direction.

9. The riser brace clamp assembly of claim 7, wherein the lower frame further comprises a square counter bore recess which engages with a clamp bolt to prevent rotation of the bolt.

10. The riser brace clamp assembly of claim 1, wherein the upper clamp includes a latch spring for preventing rotation of a bolt nut.

* * * * *